(12) United States Patent
Peterson

(10) Patent No.: US 11,433,803 B2
(45) Date of Patent: *Sep. 6, 2022

(54) VEHICLE DOOR HANDLE ASSEMBLY WITH LIGHT SENSING MODULE

(71) Applicant: Magna Mirrors of America, Inc., Holland, MI (US)

(72) Inventor: Kenneth C. Peterson, Ada, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/446,854

(22) Filed: Sep. 3, 2021

(65) Prior Publication Data

US 2021/0394668 A1    Dec. 23, 2021

Related U.S. Application Data

(63) Continuation of application No. 17/247,489, filed on Dec. 14, 2020, now Pat. No. 11,110,854, which is a continuation of application No. 16/662,213, filed on Oct. 24, 2019, now Pat. No. 10,864,846.

(60) Provisional application No. 62/750,841, filed on Oct. 26, 2018.

(51) Int. Cl.
| | |
|---|---|
| *B60Q 1/26* | (2006.01) |
| *B60Q 1/50* | (2006.01) |
| *E05B 41/00* | (2006.01) |
| *F21V 23/04* | (2006.01) |
| *B60Q 1/00* | (2006.01) |
| *F21Y 115/10* | (2016.01) |
| *F21Y 113/13* | (2016.01) |
| *B60R 25/10* | (2013.01) |

(52) U.S. Cl.
CPC ........ *B60Q 1/2669* (2013.01); *B60Q 1/0023* (2013.01); *B60Q 1/50* (2013.01); *B60R 25/1003* (2013.01); *E05B 41/00* (2013.01); *F21V 23/0464* (2013.01); *F21V 23/0471* (2013.01); *F21Y 2113/13* (2016.08); *F21Y 2115/10* (2016.08)

(58) Field of Classification Search
CPC .............................. B60Q 1/2669; B60Q 3/267
See application file for complete search history.

(56) References Cited

U.S. PATENT DOCUMENTS

| | | |
|---|---|---|
| 5,371,659 A | 12/1994 | Pastrick et al. |
| 5,497,305 A | 3/1996 | Pastrick et al. |
| 5,669,699 A | 9/1997 | Pastrick et al. |

(Continued)

*Primary Examiner* — William N Harris
(74) *Attorney, Agent, or Firm* — Honigman LLP

(57) ABSTRACT

A vehicular exterior door handle assembly includes a base portion configured to mount at an exterior door handle region of a vehicular door of a vehicle, a handle portion, and a sensing module that includes at least one light emitter and at least one light sensor. With the base portion of the vehicular exterior door handle assembly mounted at the exterior door handle region of the vehicular door, the light emitter, when energized, emits light. With the base portion mounted at the exterior door handle region of the vehicular door, and with the light emitter energized, the light sensor senses light emitted by the light emitter. Responsive to light sensed by the light sensor with the light emitter energized being below a threshold level, the sensing module determines a presence of a person's hand at the handle portion.

40 Claims, 10 Drawing Sheets

(56) References Cited

U.S. PATENT DOCUMENTS

| | | |
|---|---|---|
| 5,671,996 A | 9/1997 | Bos et al. |
| 5,823,654 A | 10/1998 | Pastrick et al. |
| 5,938,321 A | 8/1999 | Bos et al. |
| 6,070,998 A | 6/2000 | Jennings et al. |
| 6,086,229 A | 7/2000 | Pastrick |
| 6,139,172 A | 10/2000 | Bos et al. |
| 6,149,287 A | 11/2000 | Pastrick et al. |
| 6,152,590 A | 11/2000 | Furst et al. |
| 6,176,602 B1 | 1/2001 | Pastrick et al. |
| 6,276,821 B1 | 8/2001 | Pastrick et al. |
| 6,280,069 B1 | 8/2001 | Pastrick et al. |
| 6,291,905 B1 | 9/2001 | Drummond et al. |
| 6,349,450 B1 | 2/2002 | Koops et al. |
| 6,396,408 B2 | 5/2002 | Drummond et al. |
| 6,416,208 B2 | 7/2002 | Pastrick et al. |
| 6,477,464 B2 | 11/2002 | McCarthy et al. |
| 6,550,103 B2 | 4/2003 | Koops et al. |
| 6,568,839 B1 | 5/2003 | Pastrick et al. |
| 6,907,643 B2 | 6/2005 | Koops et al. |
| 6,977,619 B2 | 12/2005 | March et al. |
| 7,407,203 B2 | 8/2008 | Huizenga et al. |
| 7,635,210 B2 | 12/2009 | Metros et al. |
| 8,091,280 B2 | 1/2012 | Hanzel et al. |
| 8,333,492 B2 | 12/2012 | Dingman et al. |
| 8,764,256 B2 | 7/2014 | Foote et al. |
| 8,786,401 B2 | 7/2014 | Sobecki et al. |
| 8,801,245 B2 | 8/2014 | De Wind et al. |
| 9,484,626 B2 | 11/2016 | Dykhouse |
| 9,616,808 B2 | 4/2017 | De Wind et al. |
| 10,632,968 B2 | 4/2020 | De Wind et al. |
| 10,864,846 B2 | 12/2020 | Peterson |
| 11,110,854 B2 | 9/2021 | Peterson |
| 2007/0230201 A1 | 10/2007 | Oba et al. |
| 2007/0258258 A1 | 11/2007 | Wang |
| 2010/0007463 A1 | 1/2010 | Dingman et al. |
| 2010/0088855 A1 | 4/2010 | Ruse et al. |
| 2010/0321946 A1 | 12/2010 | Dingman et al. |
| 2011/0148575 A1 | 6/2011 | Sobecki et al. |
| 2011/0160966 A1 | 6/2011 | Witte |
| 2012/0106182 A1 | 5/2012 | Minter et al. |
| 2013/0107557 A1* | 5/2013 | Dingman ............ B60R 16/0207 362/501 |
| 2013/0130674 A1* | 5/2013 | De Wind ............... B60Q 1/323 362/546 |
| 2013/0242586 A1 | 9/2013 | Huizen et al. |
| 2014/0197730 A1* | 7/2014 | Spence .................... G07C 9/20 315/80 |
| 2017/0210282 A1* | 7/2017 | Rodriguez Barros ....................... B60Q 1/2669 |
| 2018/0027634 A1 | 1/2018 | Dalavayi |
| 2018/0065537 A1 | 3/2018 | Abrams et al. |
| 2019/0106051 A1 | 4/2019 | Huizen et al. |
| 2020/0102773 A1 | 4/2020 | Sobecki |

\* cited by examiner

Light scattered or blocked by inserted hand

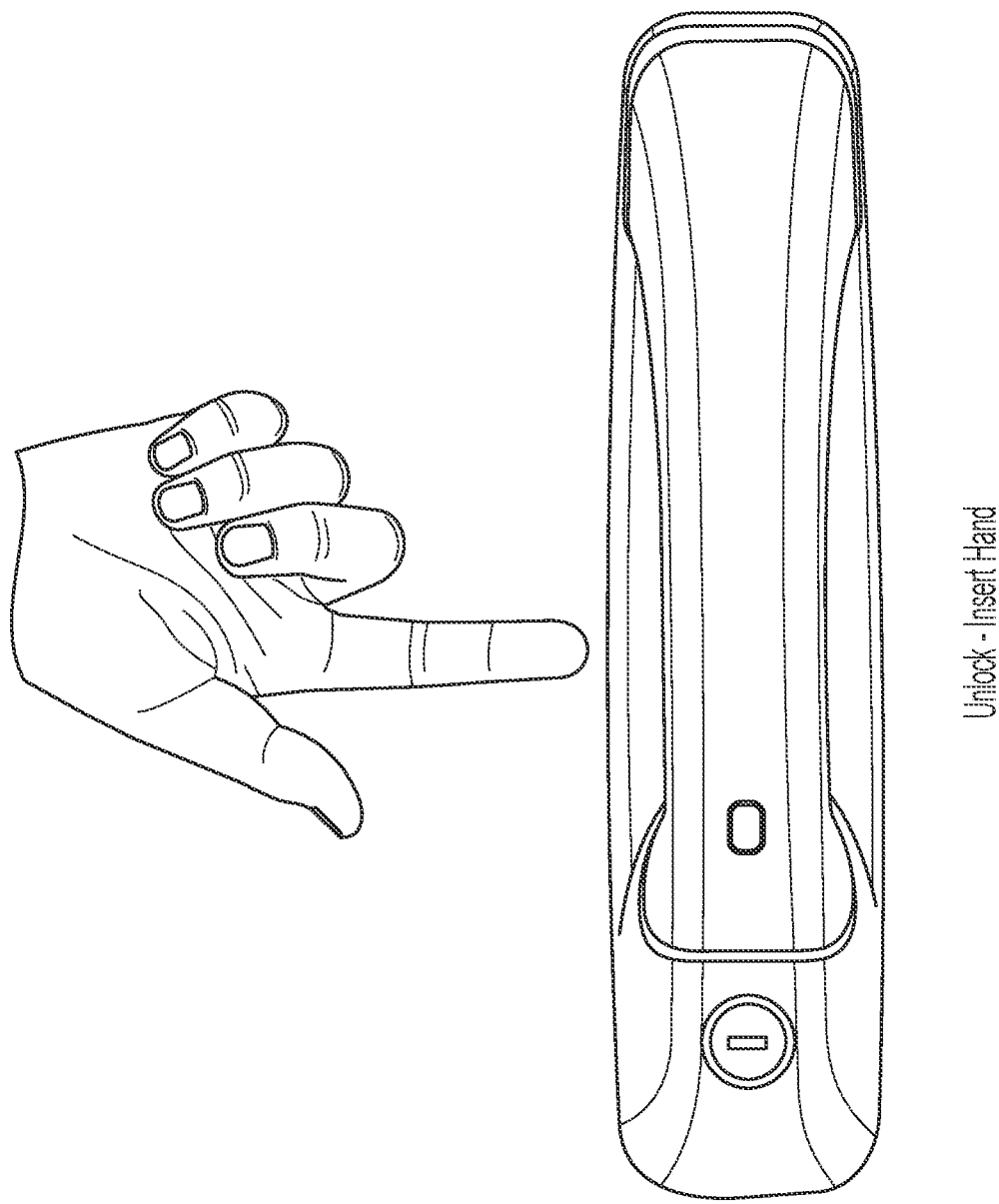

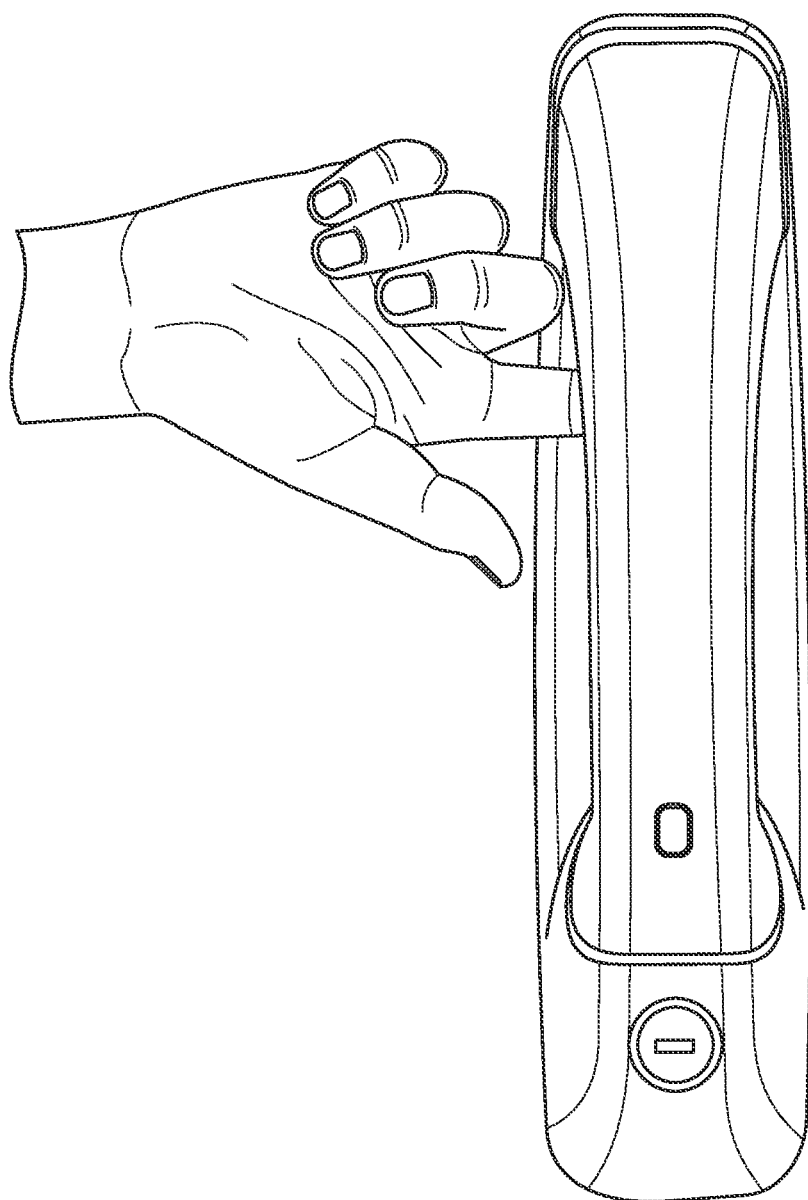

VEHICLE DOOR HANDLE ASSEMBLY WITH LIGHT SENSING MODULE

CROSS REFERENCE TO RELATED APPLICATIONS

The present application is a continuation of U.S. patent application Ser. No. 17/247,489, filed Dec. 14, 2020, now U.S. Pat. No. 11,110,854, which is a continuation of U.S. patent application Ser. No. 16/662,213, filed Oct. 24, 2019, now U.S. Pat. No. 10,864,846, which claims the filing benefits of U.S. provisional patent application Ser. No. 62/750,841, filed Oct. 26, 2018, which is hereby incorporated herein by reference in its entirety.

FIELD OF THE INVENTION

The present invention relates to door handles for vehicles and, more particularly, an exterior door handle for opening a side door of a vehicle responsive to a passive entry device or system.

BACKGROUND OF THE INVENTION

A door handle for a vehicle door typically includes a handle portion that is pivotable relative to a base portion, whereby pivotal movement of the handle portion pulls at a cable or rod to electrically trigger or move a latch mechanism to release the latch and open the door.

SUMMARY OF THE INVENTION

The present invention provides a door handle assembly configured to mount at a handle region of a vehicle door. The door handle assembly comprises a handle portion pivotally mounted at the handle region of the vehicle door and a pocket light sensing module. The handle portion is disposed at the handle region. The pocket light sensing module comprises at least one light emitting diode operable to emit light at the pocket region and a sensor that senses the light emitted by the light emitting diode. The surface of the handle region (such as a surface of a base portion or bezel portion of the handle assembly) opposite the module is configured so that, when a person's hand is not present at the handle region, the sensor detects the light reflected back to it from the surface. When a person's hand is present at the handle region, the light emitted by the light emitting diode is scattered and not reflected back toward the sensor. When the amount of light sensed by the sensor decreases by a threshold amount while the light emitting diode is activated, the light sensing module or door control module determines presence of a person's hand at the door handle and may unlock the vehicle door or doors.

These and other objects, advantages, purposes and features of the present invention will become apparent upon review of the following specification in conjunction with the drawings.

BRIEF DESCRIPTION OF THE DRAWINGS

FIGS. 10 and 11 are plan views of the door handle assembly, showing different hand motions and how the module and system can detect the different hand motions using the multiple light sensors of FIG. 9.

DESCRIPTION OF THE PREFERRED EMBODIMENTS

Figure 1:
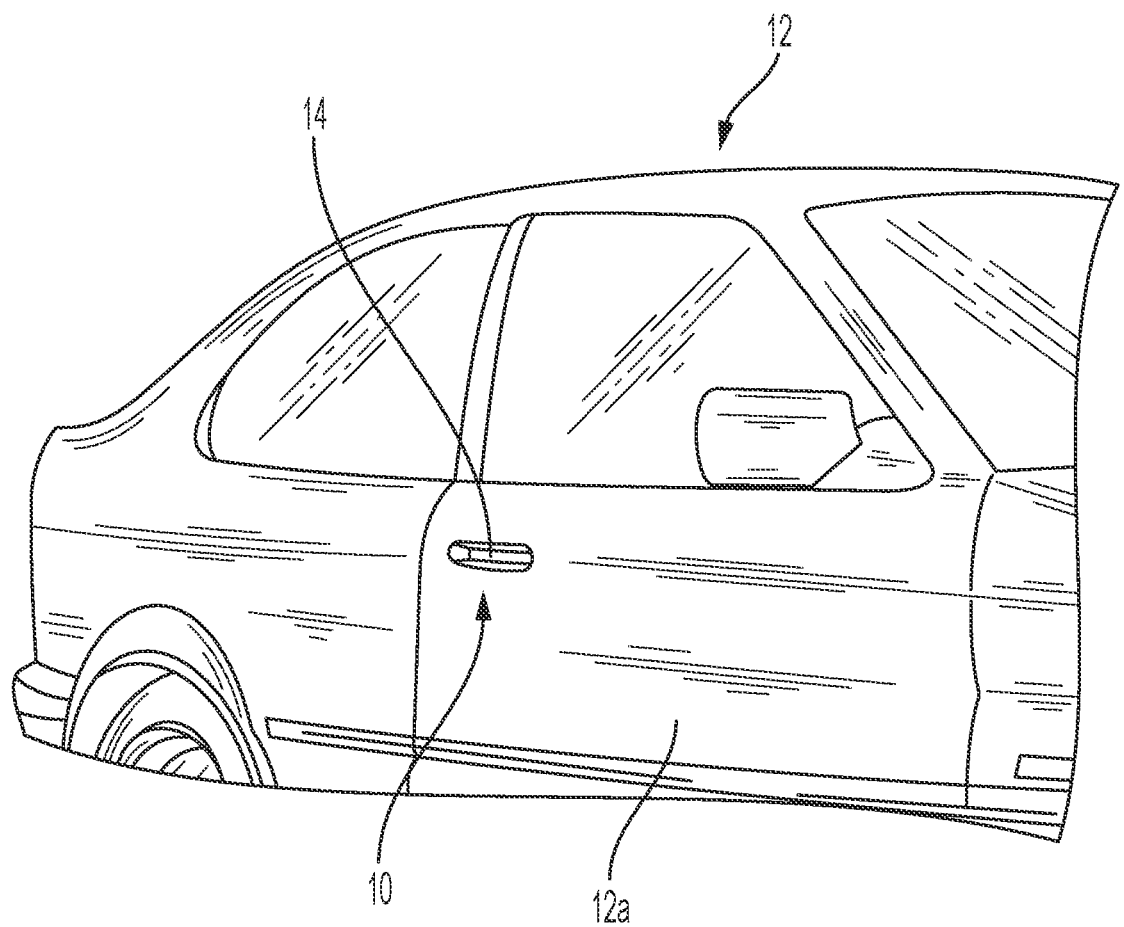
FIG. 1 is a perspective view of a vehicle with a door handle assembly of the present invention.
Figure 2:
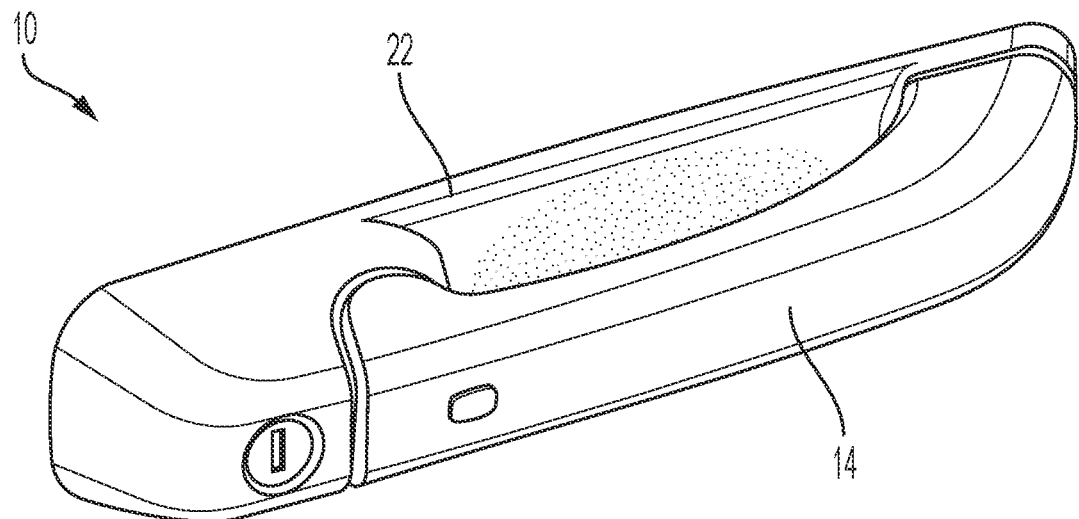
FIG. 2 is a perspective view of the door handle assembly.
Figure 3:
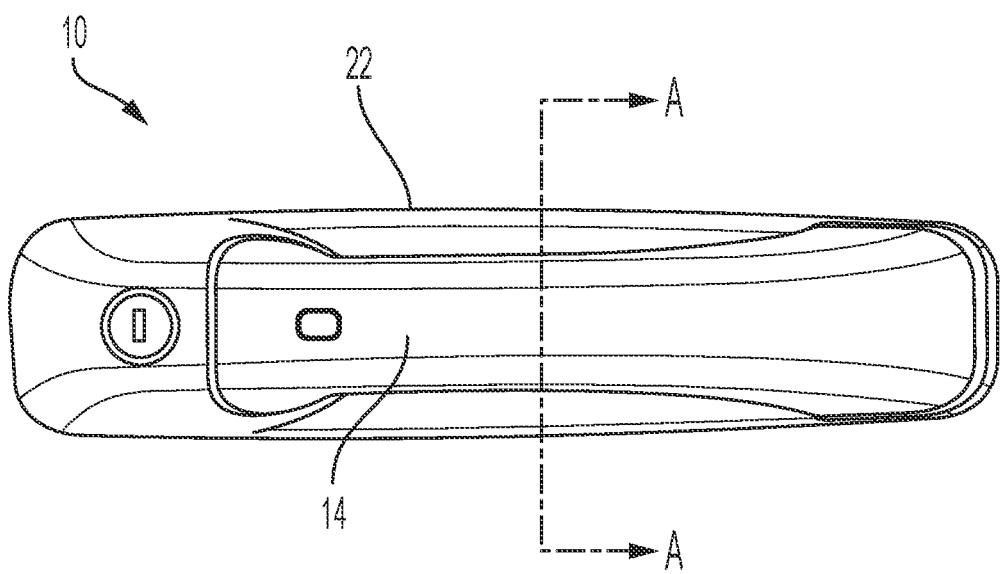
FIG. 3 is a plan view of the door handle assembly.
Figure 3A:
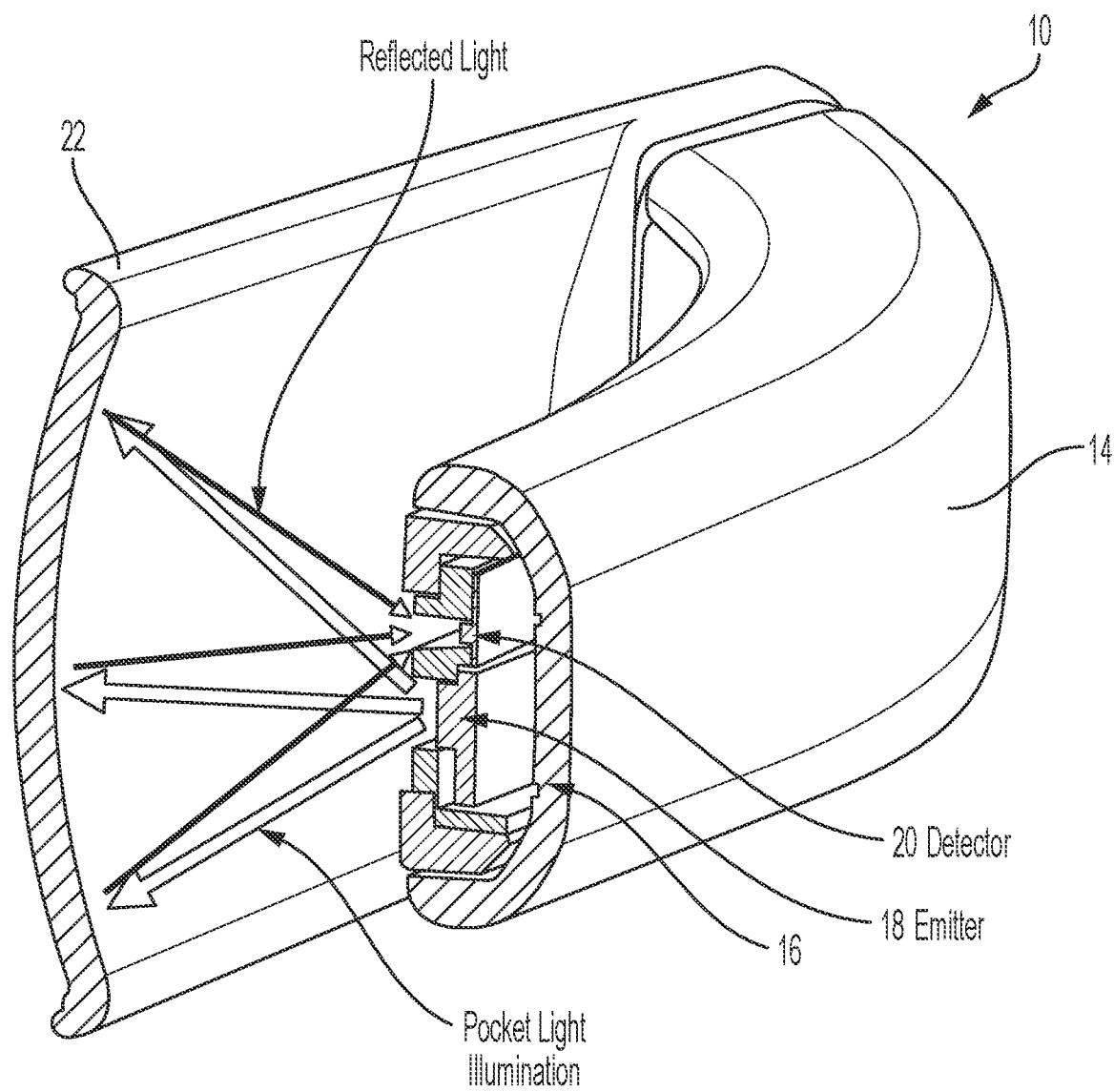
FIG. 3A is a perspective and partial sectional view of the door handle assembly taken along the line A-A in FIG. 3.

Referring now to the drawings and the illustrative embodiments depicted therein, a vehicle door handle assembly 10 is mountable to a door 12a of a vehicle 12 and operable to release a latch mechanism (not shown) of the door 12a to open the vehicle door (FIG. 1). Vehicle door handle assembly 10 includes a handle portion 14 that is disposed at the door and that is fixedly mounted at the door or to a bracket mounted to the door. The handle portion may be movably mounted at the handle region of the vehicle door (such as pivotally mounted), whereby movement of the handle portion by a user opens the vehicle door.

The door handle assembly includes a pocket light sensing module that is operable to emit light at the pocket or recess at the handle region of the vehicle door behind the handle portion 14. When actuated, the pocket light sensing module (that comprises one or more light emitting diodes) senses the light at the pocket region and determines presence of a person's hand at the pocket region and may determine motion of the hand, as discussed below. Because known capacitive sensors for passive keyless entry systems have problems with rain, latency, sensitivity, cost, and the like, the use of a light emitter and light sensor (such as at the pocket region of the vehicle door handle) provides an enhanced means for detecting presence of a person's hand at the door handle.

The module may be disposed at the inside portion of the handle 14 opposite a bezel or base portion 22 of the door handle assembly 10 (with the bezel 22 disposed at the door of the vehicle when the door handle assembly is mounted at the vehicle). For example, and such as shown in FIGS. 2-5, the pocket light sensing module 16 is disposed along the inside portion of the handle portion 14. The module 16 includes at least one light emitting diode 18 and at least one light sensor or detector 20 both disposed at a single or common circuit element or printed circuit board disposed partially along the handle portion 14 of the door handle assembly.

Figure 4:
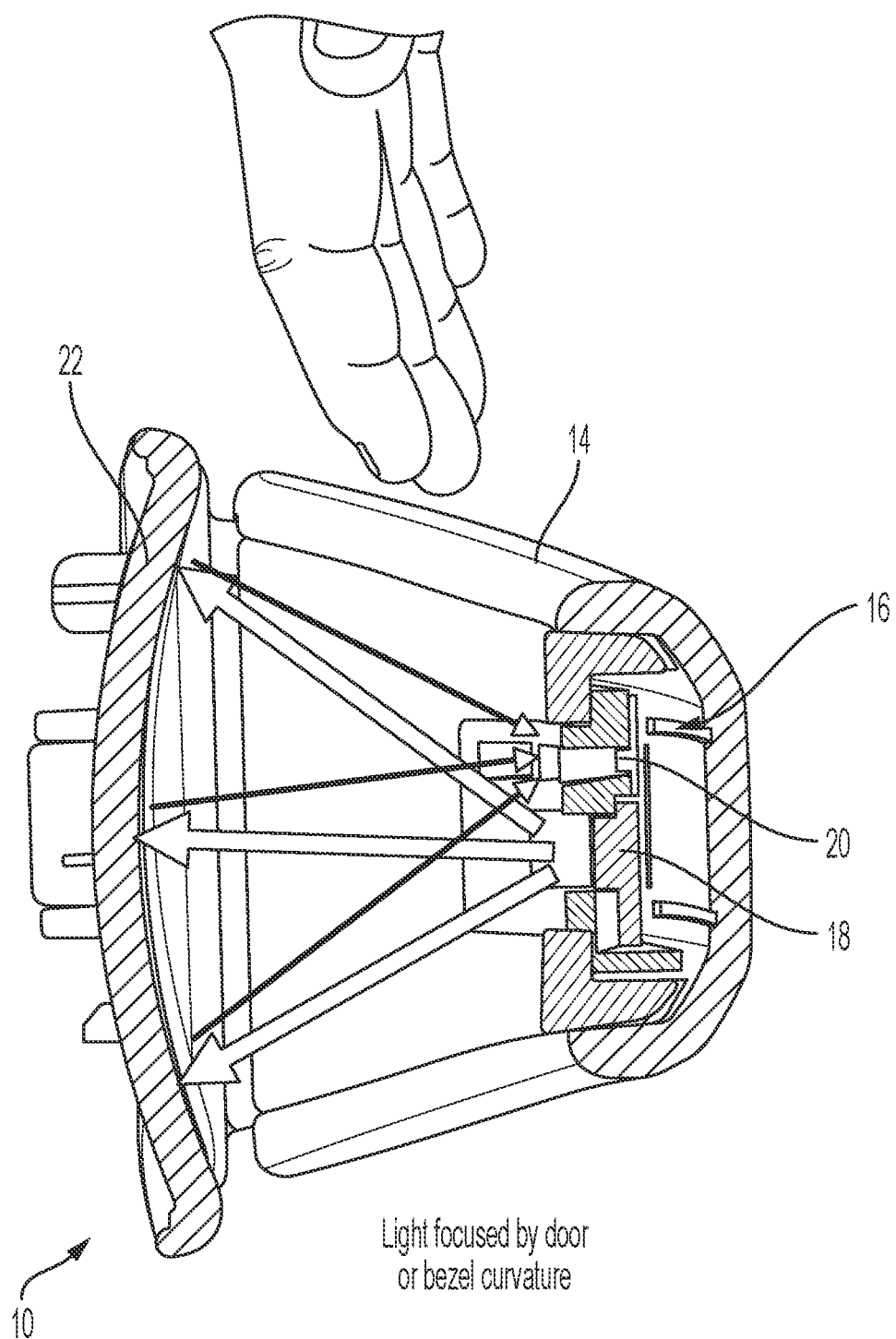
FIG. 4 is a partial sectional view of the door handle assembly, showing the light emitted by the light sensing module when a person's hand is not in the door pocket.
Figure 5:
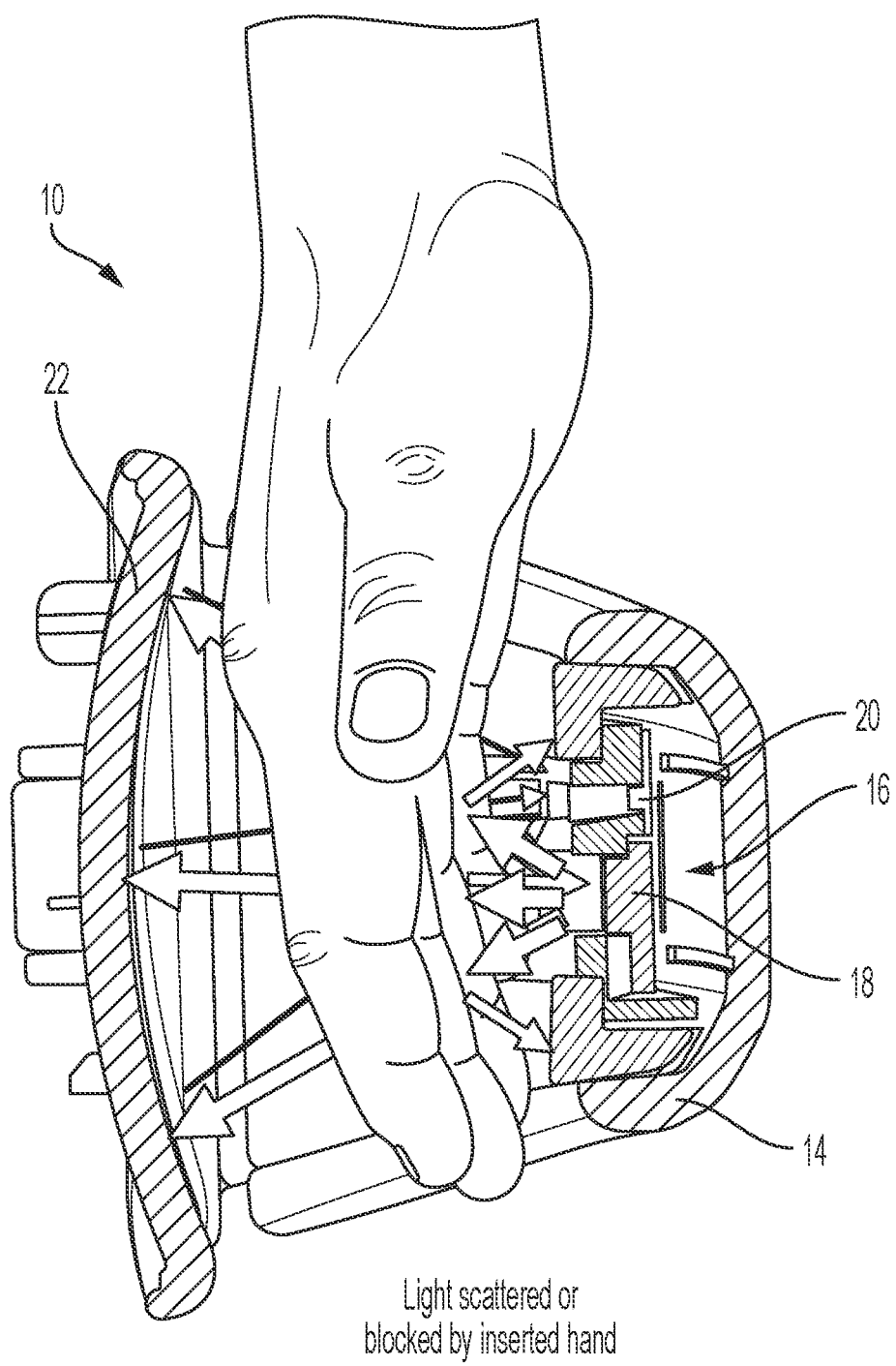
FIG. 5 is another partial sectional view of the door handle assembly, showing the light emitted by the light sensing module when a person's hand is in the door pocket.

As shown in FIG. 4, the light emitting diode 18 at the handle portion 14 emits light toward the pocket region or bezel 22 at the vehicle door and the detector 20 detects the light that reflects back from the pocket region. The bezel surface (e.g., a surface of a base portion of the handle assembly or a surface of the vehicle door panel at the handle region or the like) is configured or curved to focus or reflect or direct the emitted light back toward the light sensor, so that the light sensor senses the reflected light when a person's hand is not present at the pocket region. As shown in FIG. 5, when a person's hand is present at the pocket region (between the handle portion and the bezel), the light reflects off of the person's hand in a scattered manner, so that the light is scattered or blocked by the inserted hand and is not focused or reflected or directed back toward the light sensor.

The light emitting and sensing module may comprise any suitable module, such as a TEMD6200 FX01 module available from Vishay Semiconductors. The module may provide high photo sensitivity and may have spectral sensitivity similar to that of a human eye. Since the pocket light uses visible light, the sensor is sensitive to visible light (however, optionally the pocket light may use or emit infrared or near infrared light and the sensor may be sensitive to infrared or near infrared light). The sensor may be more sensitive to one color of light than others. For example, the sensor may be more sensitive to green light (such as light within a spectral band or range of about 490 nm to about 570 nm). For best performance and lower cost, a monochromatic green source may be used for sensing (that emits light having a wavelength between about 490 nm and about 570 nm). Green, as well as red, are good indicator colors to be used for lock status, so the module may utilize both green and red light sources (with the red light source emitting visible red light having a wavelength between about 620 nm and about 720 nm).

Figure 6:
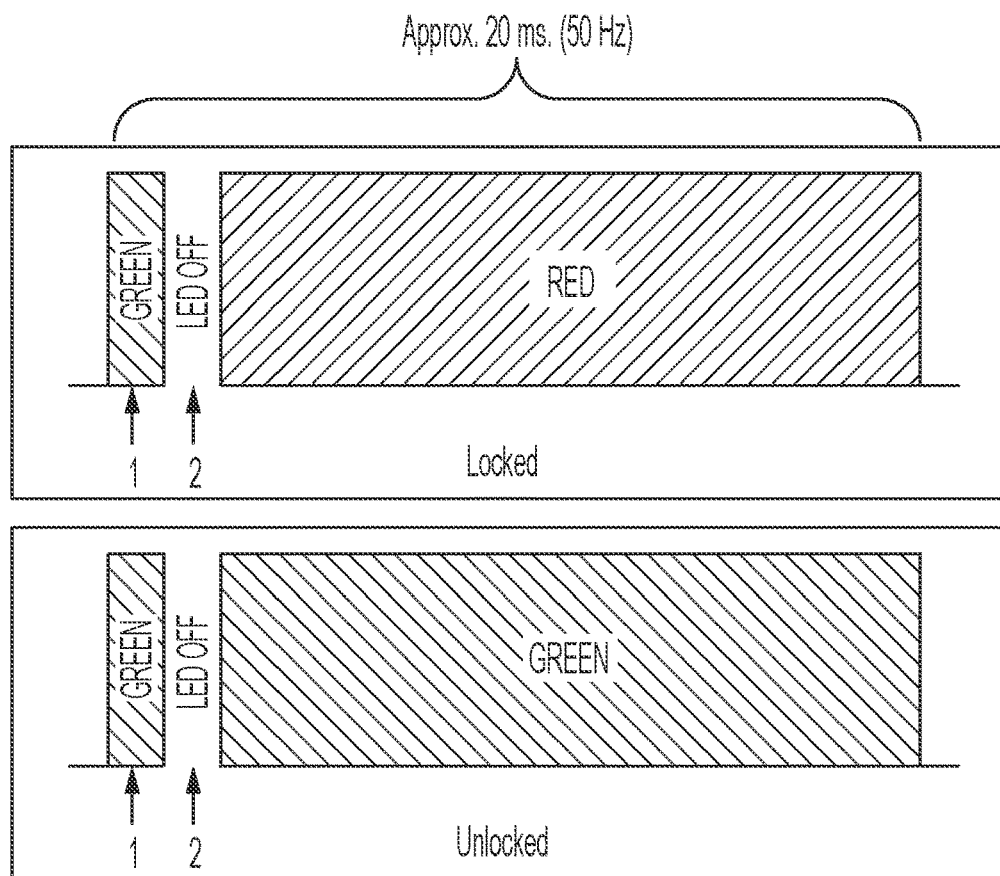
FIG. 6 shows lighting patterns that may be used by the light sensing module to show locked or unlocked conditions.

The LED and the sensor may be periodically or episodically operated to determine ambient light at the door handle and to determine presence of a person's hand at the door handle. For example, during a sensing cycle, and with reference to FIG. 6, the sensor takes one reading with green illumination (1), and one reading with no illumination (2). The difference between the readings is evaluated for sensing the emitted light (and sensing blockage of the emitted light) and thus sensing presence of a hand. This negates the effect of ambient light. When the difference between the readings drops below a preset or predetermined or selected threshold light level, a touch or hand presence is indicated.

The module or system thus determines the reduction in light sensed based on the level or intensity of ambient light at the door handle, and thus reduces false determinations of no hand present when ambient light is high. The module may determine presence of the hand by determining when the sensed light intensity when sensing with the LED energized is at or within a threshold difference level of the sensed ambient light intensity. Optionally, a threshold intensity at which presence of a hand is determined (when the LED is energized) may vary as a function of the determined ambient light level at the vehicle. In other words, the threshold intensity level at which presence of a hand is determined (when the LED is energized) may be greater for higher ambient lighting conditions (e.g., when the vehicle is outside on a sunny day) than for lower ambient lighting conditions (e.g., at nighttime).

The module, during the remaining portion of the cycle, may operate to illuminate the handle region with the indicator color of choice (e.g., red for locked, green for unlocked). The sensing interval is small compared to the overall interval, so the illumination appears to be predominantly the door lock status indicator color (e.g., red for locked, green for unlocked). For example, the sensing cycle may comprise one second or two seconds or any suitable time period, with the sensing part of the cycle comprising 20 ms of sensing with the LED on and 20 ms of sensing with the LED off, and with the rest of the cycle time with the door lock status indicator on (and with the module not sensing or capturing light with the sensor during the rest of the cycle time).

Figure 7:
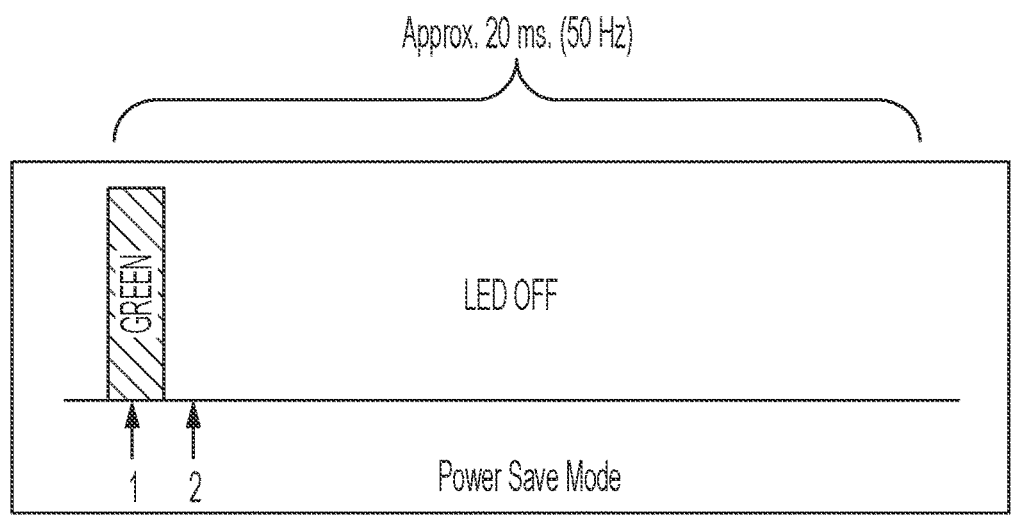
FIG. 7 shows a lighting pattern that may be used by the light sensing module when operating in a power saving mode.

To save power, the LEDs can be kept off in between sensing intervals to minimize power consumption. The green LED only needs to be illuminated long enough to get a reading on the sensor. The time to read the sensor depends primarily on the sample interval of the ND channel on the microcontroller. Thus, and such as shown in FIG. 7, the green LED may be episodically activated or energized for a 20 ms sensing period, which may be repeated every 20 ms or every 100 ms or every second (or any other suitable time period). The power saving mode may be in effect (such that the sensor is deactivated) for extended periods of time, whereby the system may exit the power saving mode (and start episodically sensing for 20 ms periods at a desired rate) responsive to detection of a person approaching the vehicle or detection of a remote transmitting device or other remote device associated with the vehicle or owner of the vehicle, such as a user's or owner's smart phone or the like.

Figure 8:
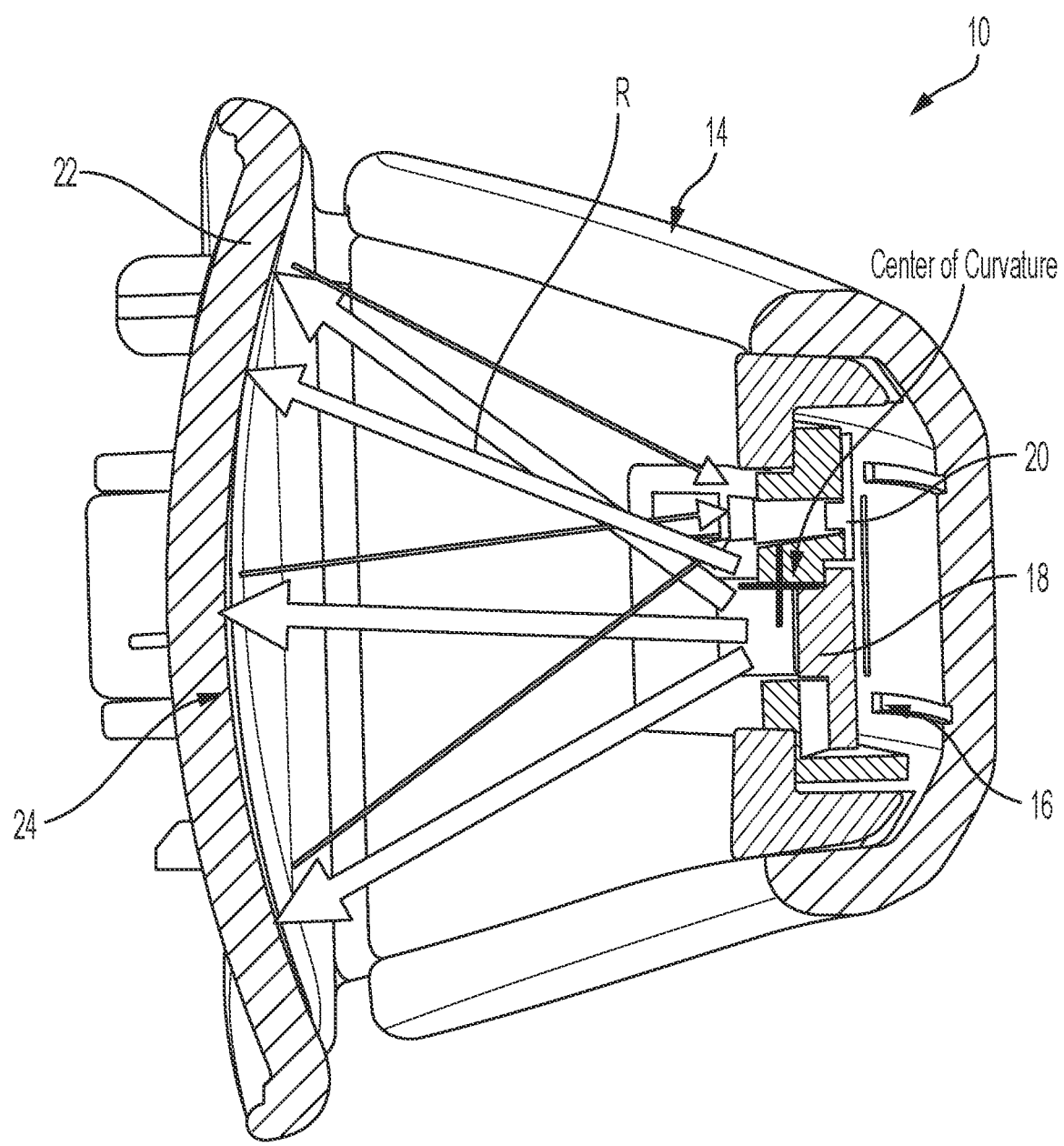
FIG. 8 is another partial sectional view of the door handle assembly.

To maximize or optimize the specular reflection of visible light incident on the paint gloss at the bezel or door handle region of the door, the body pocket or handle bezel surface may be shaped so that the center of curvature coincides with the sensor module. For example, and such as shown in FIG. 8, the curvature of the bezel 22 may have a uniform or substantially uniform radius of curvature (R) with the center of curvature at or near the light sensor or detector 20 or between the light emitter 18 and the detector 20 (such as the center of curvature being below the sensor and above the emitter as shown in FIG. 8, but alternatively the center of curvature may be below the emitter and above the sensor). Thus, light emitted by the emitter 18 reflects off the curved specularly reflective bezel or door surface 22 and back toward the center of the curvature and toward the detector 20. Optionally, a chrome strip or light reflecting strip or coating 24 (see FIG. 8) or other suitable metallic reflector material may be added to the pocket to improve reflection intensity of light incident at the strip or coating at the curved surface. A lens or cover element(s) can be added at the light source and/or sensor to limit the sensing range and/or enhance sensitivity of the detector.

Optionally, and because the handle pocket may be long and narrow (such as for a strap type handle), multiple sensors (see FIG. 9) may be disposed along the handle portion to enhance detection of a hand at the handle portion. The surface area of the bezel opposite each LED and sensor may be curved to reflect light emitted from the respective LED back toward the respective sensor. The multiple sensors may be used to detect or sense motion of the hand (by sensing when the light emitted by one or more light emitting diodes at the handle is blocked or interrupted and not detected by the detectors), and thus detect or determine or sense motion or a gesture made by the hand.

Figure 9:
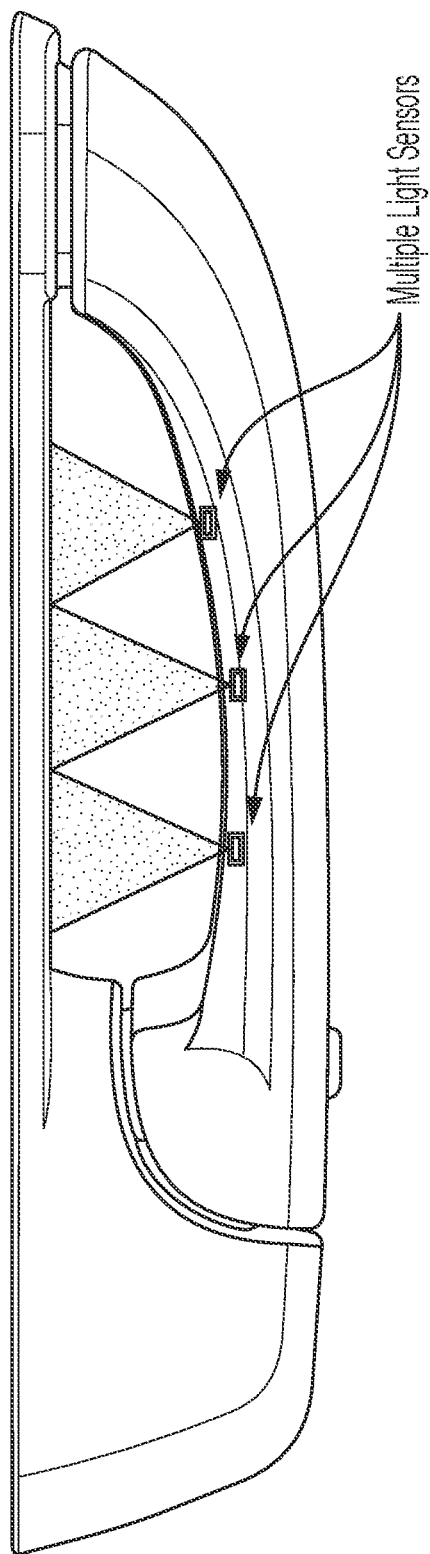
FIG. 9 is a top view of the door handle assembly, showing a module with multiple light sensors.

For example, and such as shown in FIGS. 9-11, the sensors (which may be arranged along the length of the handle portion) may be able to determine when a person's hand is inserted into the pocket region and may be able to determine when a person's hand is moved forward or rearward along the handle portion. Thus, for example, when the door is locked, the LED (or LEDs) of the module may emit red light, and the sensor may detect insertion of a person's hand into the pocket region (FIG. 10). If the person also is identified as an authorized user of the vehicle (such as via detection of or a signal from a remote keyless entry device or key fob or the like), the door control may unlock the door to allow the person to open the door. If the door is unlocked, the LED (or LEDs) of the module may emit green light, and the sensor may detect insertion of a person's hand into the pocket region (by detecting a decrease in light intensity at one of the sensors when the LED(s) is/are energized) and a swipe of the hand along the handle region, such as rearward along the handle region (by detecting a decrease in light intensity at sequential or successive ones of the light sensors in a particular direction along the handle portion), whereby the door control locks the vehicle doors. Optionally, when the door is already unlocked, the system or module, responsive to determination of a swipe in the "unlocking direction" may generate a signal that results in the vehicle door being opened (such as a signal that is received at a door control module or body control module of the vehicle, which, responsive to receiving the signal, actuates a door latch mechanism to open the vehicle door).

The arrangement of LEDs and light sensors along the handle portion may comprise multiple sets of an LED and a respective sensor, with each set being arranged relative to a center of the pocket surface curvature at the base portion opposite to that set. For example, the arrangement shown in FIG. 8 may be repeated along the handle portion for each of the sets of an LED (e.g., a green light-emitting LED) and a light sensor. For applications where each set comprises a green light-emitting LED, one or all of the green light-emitting LEDs may be energized to provide the green illumination at the pocket region when the door is unlocked and the module is not sensing light for detecting presence of a person's hand at the pocket region or handle portion. Optionally, the handle portion may also include a plurality of red light-emitting LEDs or may only include a single red light-emitting LED that may be energized to provide the red illumination at the pocket region when the door is locked and the module is not sensing light for detecting presence of a person's hand at the pocket region or handle portion.

Thus, the light emitting and sensing module provides sensing of light emitted from a pocket light for detecting touch at the door handle. The module thus may comprise a low cost module, having a light emitting diode and a light sensor or photodiode disposed at an interior portion or surface of the handle (optionally, the LED and sensor may be disposed at the bezel and the inner surface of the handle may be formed to reflect light emitted by the LED back toward the sensor). The output of the sensor or photodiode is processed to determine changes in light sensed by the sensor. When the change or decrease in sensed light reaches a threshold level (such as by sensing light at or below a threshold level when the LED is energized), the light emitting and sensing module (or the door control module or other control of the door handle assembly or vehicle door or the vehicle itself) determines presence of a person's hand at the door handle. For example, when the LED is energized and no hand is present at the door handle, the light sensor may sense light at a first intensity level, and when the LED is energized and a hand is present at the door handle, the light sensor may sense light at a second intensity level that is less than the first intensity level. The difference between the first (higher) intensity level and the second (lower) intensity level is a predetermined threshold change or threshold decrease in sensed light, whereby, upon determination of light at the second or lower intensity level or determination of such a change or reduction in sensed light, the system determines presence of a hand at the door handle.

Optionally, the module may use multiple sensors to detect gestures at the door handle. For example, the module may also include multiple LEDs disposed along the door handle. The multiple sensors may be arranged horizontally along the door handle (as shown in FIG. 9) and/or vertically to sense horizontal and/or vertical motion of a hand at the door handle pocket region.

The module, using lower cost LEDs and light sensors, may provide enhanced reliability, lower cost and added value to the door handle. Optionally, the module may emit (and detect) infrared or near infrared light that is not noticeable by the person approaching the vehicle. The module may use passive infrared emitting and/or detecting or active infrared emitting and detecting.

The door handle assembly and light emitting and detecting module may utilize aspects of the assemblies described in U.S. Publication No. US-2019-0106051, which is hereby incorporated herein by reference in its entirety. The door handle assembly may comprise any suitable type of door handle assembly, and may include or incorporate aspects of the door handle assemblies and lighting devices described in U.S. Pat. Nos. 6,349,450; 6,550,103; 6,907,643; 7,407,203; 8,333,492; 8,786,401 and/or 8,801,245, and/or U.S. Publication Nos. US-2010-0088855 and/or US-2010-0007463, which are hereby incorporated herein by reference in their entireties. Although shown as a strap type handle, the handle assembly may comprise any suitable type of vehicle door handle assembly, such as a paddle type vehicle door handle assembly (having a paddle or the like that may be pulled at to open the vehicle door) or other type of vehicle door handle assembly, while remaining within the spirit and scope of the present invention.

Optionally, the door handle assembly may comprise a flush door handle assembly (such as of the types described in U.S. Pat. No. 8,786,401, which is hereby incorporated herein by reference in its entirety), whereby the lighting and sensing module may actuate to illuminate the handle portion and may also emit light through the handle portion or around the handle portion. Optionally, the door handle assembly of the present invention may include a soft touch handle portion, such as utilizing the principles described in U.S. Pat. Nos. 6,349,450; 6,550,103 and/or 6,907,643, which are hereby incorporated herein by reference in their entireties The door handle assembly is thus operable to open the vehicle door when a user grasps the door handle portion at the side of the vehicle door. The door handle assembly may also be operable in conjunction with a passive keyless entry or other sensing system that is operable to determine whether or not the person at the vehicle door is authorized for entry into the vehicle, and may only open the vehicle door when that system recognizes the user or key fob or transmitting device associated with the owner or authorized user of the vehicle. Optionally, the door handle assembly may be associated with or in communication with a door zone module, such as by utilizing aspects of the vehicle door systems described in U.S. Publication No. US-2010-0007463, which is hereby incorporated herein by reference in its entirety.

Optionally, the door handle assembly may include or may be associated with an antenna for receiving signals from or communicating with a remote device. For example, the antenna (such as, for example, an antenna of the types described in U.S. Pat. Nos. 9,484,626 and/or 6,977,619, which are hereby incorporated herein by reference in their entireties) may communicate a signal to the door locking system via a wire connection or the like, or wirelessly, such as via a radio frequency signal or via an infrared signal or via other wireless signaling means. Such connections can include cables, wires, fiber optic cables or the like. The communication to the locking system may be via a vehicle bus or multiplex system, such as a LIN (Local Interconnect Network) or CAN (Car or Controlled Area Network) system, such as described in U.S. Pat. Nos. 6,291,905; 6,396,408 and/or 6,477,464, which are all hereby incorporated herein by reference in their entireties. The vehicle door may then be unlocked and/or the illumination source or sources may be activated as a person carrying a remote signaling device approaches the door handle. Optionally, other systems may be activated in response to the remote signaling device, such as vehicle lighting systems, such as interior lights, security lights or the like (such as security lights of the types disclosed in U.S. Pat. Nos. 8,764,256; 6,280,069; 6,276,821; 6,176,602; 6,152,590; 6,149,287; 6,139,172; 6,086,229; 5,938,321; 5,671,996; 5,497,305; 6,416,208 and/or 6,568,839, and/or U.S. Publication No. US-2013-0242586, all of which are hereby incorporated herein by reference in their entireties), or the vehicle ignition, or any other desired system, while remaining within the spirit and scope of the present invention. The door handle and/or illumination module may be in communication with other systems and/or controls of the vehicle door and/or vehicle, such as by utilizing aspects of the door systems described in U.S. Publication No. US-2010-0007463, which is hereby incorporated herein by reference in its entirety.

Optionally, the lighting and sensing module may comprise a strip light or pocket light or the like, and the door handle assembly may include a ground illumination light and/or other light or lighting element, such as a projection light or the like, such as by utilizing aspects of the door handle assemblies and lighting systems described in U.S. Pat. Nos. 5,371,659; 5,497,305; 5,669,699; 5,823,654; 6,349,450; 6,550,103; 8,786,401 and/or 8,801,245, and/or U.S. Publication Nos. US-2010-0088855 and/or US-2010-0007463, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior door handle assembly, said vehicular exterior door handle assembly comprising:
a base portion configured to mount at an exterior door handle region of a vehicular door of a vehicle;
a handle portion;
wherein said handle portion, with said base portion of said vehicular exterior door handle assembly mounted at the exterior door handle region of the vehicular door, is movable relative to said base portion by a user to actuate a latch mechanism for opening the vehicular door;
a sensing module comprising at least one light emitter and at least one light sensor;
wherein, with said base portion of said vehicular exterior door handle assembly mounted at the exterior door handle region of the vehicular door, said at least one light emitter, when energized, emits light;
wherein, with said base portion of said vehicular exterior door handle assembly mounted at the exterior door handle region of the vehicular door, and with said at least one light emitter energized, said at least one light sensor senses light emitted by said at least one light emitter; and
wherein, responsive to light sensed by said at least one light sensor with said at least one light emitter energized being below a threshold level, said sensing module determines a presence of a person's hand at said handle portion.

2. The vehicular exterior door handle assembly of claim 1, wherein said at least one light emitter of said sensing module emits red light when energized responsive at least in part to a signal indicative of locking the vehicular door.

3. The vehicular exterior door handle assembly of claim 2, wherein said at least one light emitter of said sensing module emits green light when energized responsive at least in part to a signal indicative of unlocking the vehicular door.

4. The vehicular exterior door handle assembly of claim 3, wherein said at least one light emitter comprises (i) a red light-emitting light emitter that, when energized, emits red light and (ii) a green light-emitting light emitter that, when energized, emits green light.

5. The vehicular exterior door handle assembly of claim 1, wherein said sensing module is disposed at an inner portion of said handle portion that opposes said base portion, and wherein said at least one light sensor senses light emitted by said at least one light emitter that is reflected off said base portion.

6. The vehicular exterior door handle assembly of claim 5, wherein a light-transmissive cover element of said sensing module comprises an inner surface of said inner portion of said handle portion.

7. The vehicular exterior door handle assembly of claim 1, wherein said at least one light emitter comprises at least one light emitting diode.

8. The vehicular exterior door handle assembly of claim 1, wherein said at least one light emitter comprises a plurality of light emitting diodes.

9. The vehicular exterior door handle assembly of claim 1, wherein said at least one light sensor comprises a plurality of light sensors.

10. The vehicular exterior door handle assembly of claim 9, wherein said sensing module, with said at least one light emitter energized, senses movement of the person's hand at said handle portion responsive to sensing of light by said plurality of light sensors.

11. The vehicular exterior door handle assembly of claim 1, wherein, with said base portion of said vehicular exterior door handle assembly mounted at the exterior door handle region of the vehicular door, and with said at least one light emitter energized, said at least one light sensor senses light emitted by said at least one light emitter that is reflected off a bezel portion of said base portion.

12. The vehicular exterior door handle assembly of claim 11, wherein the bezel portion is formed to reflect light emitted by said at least one light emitter toward said at least one light sensor.

13. The vehicular exterior door handle assembly of claim 12, wherein the bezel portion comprises a curved specularly reflective surface.

14. The vehicular exterior door handle assembly of claim 1, wherein said at least one light sensor senses light emitted by said at least one light emitter that is reflected off said base portion, and wherein said base portion is formed to reflect light emitted by said at least one light emitter toward said at least one light sensor.

15. The vehicular exterior door handle assembly of claim 14, wherein said base portion comprises a curved specularly reflective surface having a center of curvature between said at least one light emitter and said at least one light sensor.

16. The vehicular exterior door handle assembly of claim 1, wherein said sensing module is operated to (i) sense ambient light at said vehicular exterior door handle assembly when said at least one light emitter is not energized and (ii) determine the presence of the person's hand at said handle portion when said at least one light emitter is energized.

17. The vehicular exterior door handle assembly of claim 16, wherein said at least one light emitter, when energized, emits green light, and wherein said at least one light sensor (i) senses light when said at least one light emitter is emitting green light and (ii) senses ambient light when said at least one light emitter is not energized, and wherein determination of the presence of the person's hand at said handle portion is based at least in part on a sensed ambient light level.

18. The vehicular exterior door handle assembly of claim 17, wherein determination of the presence of the person's hand at said handle portion is based at least in part on a difference between the sensed ambient light level and a light level sensed when said at least one light emitter is emitting green light.

19. The vehicular exterior door handle assembly of claim 18, wherein said sensing module determines the presence of the person's hand at said handle portion when the difference between the light sensed when said at least one light emitter is emitting green light and the sensed ambient light level is below a threshold.

20. The vehicular exterior door handle assembly of claim 17, wherein the threshold level of sensed light at which said sensing module determines the presence of the person's hand at said handle portion varies based at least in part on the sensed ambient light level.

21. The vehicular exterior door handle assembly of claim 1, wherein, when said sensing module is not operating to determine the presence of the person's hand at said handle portion, said at least one light emitter emits visible red light responsive to a signal indicative of locking the vehicular door.

22. The vehicular exterior door handle assembly of claim 1, wherein, when said sensing module is not operating to determine the presence of the person's hand at said handle portion, said at least one light emitter emits visible green light responsive to a signal indicative of unlocking the vehicular door.

23. A vehicular exterior door handle assembly, said vehicular exterior door handle assembly comprising:
a base portion configured to mount at an exterior door handle region of a vehicular door of a vehicle;
a handle portion;
wherein said handle portion, with said base portion of said vehicular exterior door handle assembly mounted at the exterior door handle region of the vehicular door, is movable relative to said base portion by a user to actuate a latch mechanism for opening the vehicular door;
a sensing module comprising at least one light emitter and a plurality of light sensors;
wherein said at least one light emitter comprises at least one light emitting diode;
wherein, with said base portion of said vehicular exterior door handle assembly mounted at the exterior door handle region of the vehicular door, said at least one light emitter, when energized, emits light;
wherein, with said base portion of said vehicular exterior door handle assembly mounted at the exterior door handle region of the vehicular door, and with said at least one light emitter energized, said plurality of light sensors senses light emitted by said at least one light emitter;
wherein, responsive to light sensed by at least one light sensor of said plurality of light sensors with said at least one light emitter energized being below a threshold level, said sensing module determines a presence of a person's hand at said handle portion; and
wherein said sensing module, with said at least one light emitter energized, senses movement of the person's hand at said handle portion responsive to sensing of light by multiple light sensors of said plurality of light sensors.

24. The vehicular exterior door handle assembly of claim 23, wherein said at least one light emitter of said sensing module emits red light when energized responsive at least in part to a signal indicative of locking the vehicular door.

25. The vehicular exterior door handle assembly of claim 23, wherein said sensing module is disposed at an inner portion of said handle portion that opposes said base portion, and wherein said plurality of light sensors senses light emitted by said at least one light emitter that is reflected off said base portion.

26. The vehicular exterior door handle assembly of claim 23, wherein said base portion is formed to reflect light emitted by said at least one light emitter toward said plurality of light sensors.

27. The vehicular exterior door handle assembly of claim 26, wherein said base portion comprises a curved specularly reflective surface.

28. The vehicular exterior door handle assembly of claim 23, wherein said sensing module is operated to (i) sense ambient light at said vehicular exterior door handle assembly when said at least one light emitter is not energized and (ii) determine the presence of the person's hand at said handle portion when said at least one light emitter is energized.

29. The vehicular exterior door handle assembly of claim 28, wherein said at least one light emitter, when energized, emits green light, and wherein said plurality of light sensors (i) senses light when said at least one light emitter is emitting green light and (ii) senses ambient light when said at least one light emitter is not energized, and wherein determination of the presence of the person's hand at said handle portion is based at least in part on a sensed ambient light level.

30. The vehicular exterior door handle assembly of claim 29, wherein the threshold level of sensed light at which said sensing module determines the presence of the person's hand at said handle portion varies based at least in part on the sensed ambient light level.

31. The vehicular exterior door handle assembly of claim 23, wherein said at least one light emitter comprises a plurality of light emitting diodes.

32. A vehicular exterior door handle assembly, said vehicular exterior door handle assembly comprising:
a base portion configured to mount at an exterior door handle region of a vehicular door of a vehicle;
a handle portion;
wherein said handle portion, with said base portion of said vehicular exterior door handle assembly mounted at the exterior door handle region of the vehicular door, is movable relative to said base portion by a user to actuate a latch mechanism for opening the vehicular door;
a sensing module comprising at least one light emitter and at least one light sensor;
wherein said at least one light emitter comprises at least one light emitting diode;
wherein, with said base portion of said vehicular exterior door handle assembly mounted at the exterior door handle region of the vehicular door, said at least one light emitter, when energized, emits light;

wherein, with said base portion of said vehicular exterior door handle assembly mounted at the exterior door handle region of the vehicular door, and with said at least one light emitter energized, said at least one light sensor senses light emitted by said at least one light emitter;

wherein, responsive to light sensed by said at least one light sensor with said at least one light emitter energized being below a threshold level, said sensing module determines a presence of a person's hand at said handle portion; and wherein the threshold level of sensed light at which said sensing module determines the presence of the person's hand at said handle portion varies based at least in part on ambient light level at the vehicle.

33. The vehicular exterior door handle assembly of claim 32, wherein said at least one light emitter of said sensing module emits red light when energized responsive at least in part to a signal indicative of locking the vehicular door.

34. The vehicular exterior door handle assembly of claim 32, wherein said sensing module is disposed at an inner portion of said handle portion that opposes said base portion, and wherein said at least one light sensor senses light emitted by said at least one light emitter that is reflected off said base portion.

35. The vehicular exterior door handle assembly of claim 32, wherein said base portion is formed to reflect light emitted by said at least one light emitter toward said at least one light sensor.

36. The vehicular exterior door handle assembly of claim 35, wherein said base portion comprises a curved specularly reflective surface.

37. The vehicular exterior door handle assembly of claim 32, wherein said at least one light sensor senses ambient light when said at least one light emitter is not energized, and wherein determination of the presence of the person's hand at said handle portion is based at least in part on the sensed ambient light level.

38. The vehicular exterior door handle assembly of claim 37, wherein determination of the presence of the person's hand at said handle portion is based at least in part on a difference between the sensed ambient light level and a light level sensed when said at least one light emitter is emitting light.

39. The vehicular exterior door handle assembly of claim 38, wherein said sensing module determines the presence of the person's hand at said handle portion when the difference between the light level sensed when said at least one light emitter is emitting light and the sensed ambient light level is below a threshold.

40. The vehicular exterior door handle assembly of claim 32, wherein, when said sensing module is not operating to determine the presence of the person's hand at said handle portion, said at least one light emitter emits visible red light responsive to a signal indicative of locking the vehicular door.

* * * * *

UNITED STATES PATENT AND TRADEMARK OFFICE
CERTIFICATE OF CORRECTION

PATENT NO. : 11,433,803 B2
APPLICATION NO. : 17/446854
DATED : September 6, 2022
INVENTOR(S) : Kenneth C. Peterson Page 1 of 1

It is certified that error appears in the above-identified patent and that said Letters Patent is hereby corrected as shown below:

In the Specification

Column 4
Line 9, "ND" should be --A/D--

Signed and Sealed this
Eleventh Day of October, 2022

Katherine Kelly Vidal
*Director of the United States Patent and Trademark Office*